April 2, 1935. D. L. URQUHART 1,996,130

FISHING REEL

Filed July 25, 1934

INVENTOR.
Davis L. Urquhart.
BY
Townsend & Loftus.
ATTORNEYS.

Patented Apr. 2, 1935

1,996,130

UNITED STATES PATENT OFFICE 1,996,130

FISHING REEL

Davis L. Urquhart, Richmond, Calif.

Application July 25, 1934, Serial No. 736,854

3 Claims. (Cl. 242—84.5)

This invention relates to a fishing reel and especially to an attachment therefor whereby overrunning and back lash of the reel when casting are prevented.

When fishing for certain varieties of fish on ocean beaches and other places, it is common practice to employ a bass pole and a casting reel. Such reels have a tendency to overrun when casting as the spool or reel rotates so rapidly that it feeds out the line faster than the line can run through the guides on the pole. This overrunning of the spool interferes with the cast and in many instances causes such a snarling of the line that it will either have to be cut free or considerable time is lost in untangling the same.

Another trouble encountered is back lash or reversing of the line when casting. For instance, when re-reeling the line after a cast for the purpose of inspecting the bait, or otherwise, it often happens that sufficient care is not taken to insure tight winding of the line on the spool. That is, a portion of the line may be re-reeled fairly slack and an overlying portion fairly tight. When this happens several of the coils of the tight portion tend to embed themselves between the slack coils and when the line is again cast the line will pay out until the embedded coils are encountered. If this happens the line will wrap about the spool and the pull on the line will become reversed. Again, if the momentum or pull on the line while casting is great enough the embedded coils will be pulled free but, even so, it offers such resistance that the cast will fall short of the mark making it necessary to re-reel and cast over again.

The object of the present invention is generally to improve the operation of reels of the character described, and particularly to provide a braking attachment whereby overrunning, back lash, and snarling of the line is prevented.

The attachment is shown by way of illustration in the accompanying drawing, in which—

Figure 1:
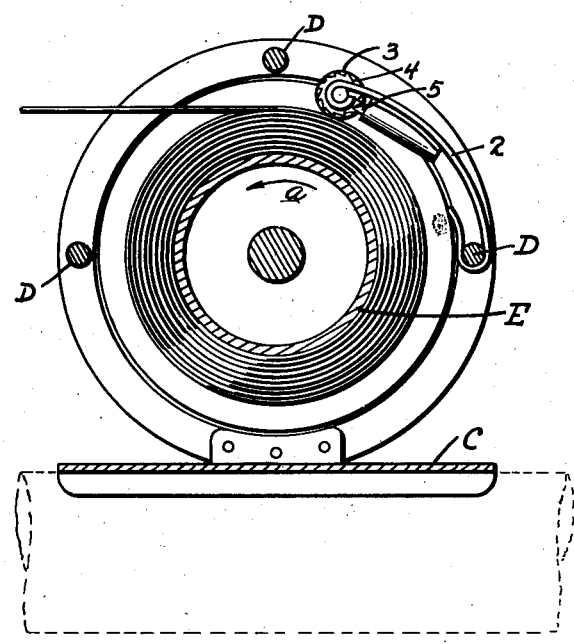
Fig. 1 is a central vertical section taken on line I—I of Fig. 2.
Figure 2:
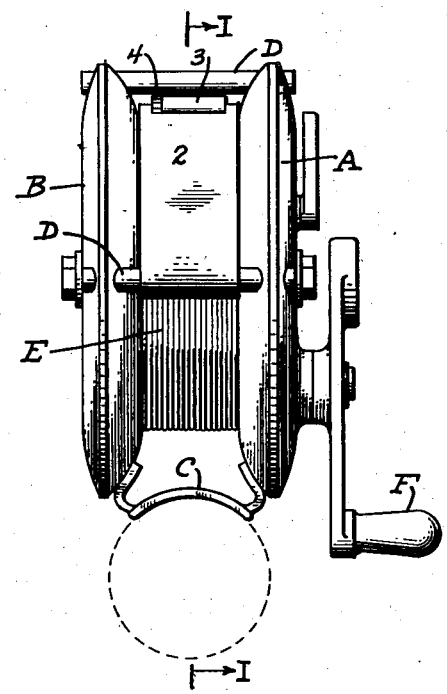
Fig. 2 is an end view of the reel.

Referring to the drawing in detail, and particularly Figs. 1 and 2, A and B indicate the side plates or heads of a reel connected by a base section C and a plurality of cross rods D. The heads, together with the base and the cross rods, constitute the frame of the reel and this frame may be attached to a fishing pole or rod in the usual manner.

Journaled between the heads of the reel is a spool E about which the line is coiled or wound and mounted on one of the heads is a hand actuated crank F which, through gearing mechanism, is connected with the spool for re-winding purposes.

The reel described is of standard construction and the attachment forming the subject matter of this application may be attached thereto or to practically any other form or make of reel. The only reason the reel here shown has been described at all is to permit its operation in conjunction with the attachment to be more clearly described.

Figure 3:
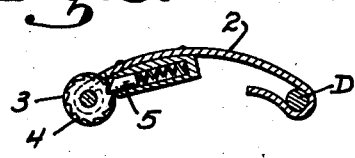
Fig. 3 is a longitudinal section taken on line III—III of Fig. 4.
Figure 4:
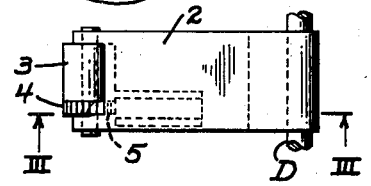
Fig 4 is a plan view of the attachment.

The attachment is best shown in Figs 1, 3 and 4. It consists of an arm 2 which is adapted to be pivotally attached to one of the cross rods D. Journaled in the free end of the arm is a roller 3 and formed on one end of the roller are ratchet teeth 4, which cooperate with a spring actuated pawl 5. The roller 3 is sufficiently wide to substantially cover the coils of line wrapped about the spool of the reel. The roller normally rests on the outermost coils and when the reel and pole are in operation the thumb of the operator or fisherman is usually applied to the arm 2 so that the roller is held against the coils of the line with a slight pressure.

In actual operation with the braking attachment, to-wit, the arm 2 and roller 3, attached to one of the cross rods D, the fisherman will advance the thumb on the arm 2 until it engages the roller 3. He will apply sufficient pressure to lock the spool of the reel against rotation. He then swings his pole backward or sideways and then forwardly to cast the line, and at a suitable time during the forward movement the thumb is retracted and held with only very slight pressure against the arm 2. The spool is thus free to run so as to permit the line to be paid out with as little resistance possible, but even so there is enough friction between the roller 3 and the line wound about the spool to prevent overrunning of the spool. The actual distance that a cast may be made is not impaired by overrunning of the spool and snarling of the line is, nevertheless, prevented.

When re-setting after a cast has been made, for instance for the purpose of inspecting the bait, re-baiting, or otherwise, it often happens that the fisherman is careless to the extent that he does not apply a uniform resistance to the line when re-reeling, hence some coils may be loose and others fairly tight. The tight coils tend to become embedded between the loose coils, and when a cast is made, the spool will rotate freely in the direction of arrow a, see Fig. 1, until one of the embedded coils is reached. If the pull on the line is sufficient the coil will be pulled loose and the line will continue to pay out and the spool to un-reel but the cast will fall short, as pulling the coil free from its embedded position naturally offers considerable resistance and if several coils have been embedded the reel will very suddenly come to a stop due to the resistance offered and then the distance the cast is made will be proportionately short.

Again, it may happen that the pull on the line while casting is not sufficient to pull the coils free and if this happens the line will follow around with the reel in the direction of arrow a and a few coils of the line may be wound upon the reel in a reverse direction, and when this is paid out the reel will naturally be reversed. This is known as back lash or reversal and is prevented in the present instance by providing the ratchet and the spring actuated pawl indicated at 5. This ratchet runs free, that is, the pawl 5 will merely slide over the teeth when the line is paying out in the right direction to the coil. If the spool tends to reverse its direction, roller 3 becomes locked by means of the pawl and as it functions as a brake the reverse rotation of the spool will immediately be stopped.

In view of the foregoing it should be evident that an attachment has been provided whereby sufficient tension is applied to the outgoing line to prevent overrunning of the reel and it should also be noted that reversal of the reel, back lash, snarling, and so on, will be entirely avoided.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is:—

1. An attachment for a fishing reel comprising an arm, one end of which is pivotally attached to one of the cross rods on the frame of the reel, said arm being cut away and forked at the opposite end and a roller journaled in the forked end of the arm, the lower surface of the roller projecting below the arm and engaging the line wound about the spool of the reel, and the upper surface of the roller projecting through the cut away portion and above the arm and adapted to be engaged by the thumb of the person using the reel.

2. An attachment for a fishing reel comprising an arm, one end of which is pivotally attached to one of the cross rods on the frame of the reel, said arm being forked at the opposite end and a roller journaled in the forked end of the arm, the lower surface of the roller projecting below the arm and engaging the line wound about the spool of the reel and the upper surface of the roller projecting above the arm and adapted to be engaged by the thumb of the person using the reel, and means for preventing rotation of the roller except in one direction.

3. An attachment for a fishing reel comprising an arm, one end of which is pivotally attached to one of the cross rods on the frame of the reel, said arm being forked at the opposite end and a roller journaled in the forked end of the arm, the lower surface of the roller projecting below the arm and engaging the line wound about the spool of the reel and the upper surface of the roller projecting above the arm and adapted to be engaged by the thumb of the person using the reel, ratchet teeth formed on the roller, and a spring actuated pawl engageable with the ratchet teeth to prevent rotation of the roller except in one direction.

DAVIS L. URQUHART.